United States Patent [19]
Schemith

[11] 3,971,578
[45] July 27, 1976

[54] UNION DEVICE FOR FLEXIBLE TUBING

[75] Inventor: Gerard Schemith, Pontarlier, France

[73] Assignee: Scovill Manufacturing Company, Waterbury, Conn.

[22] Filed: Aug. 16, 1974

[21] Appl. No.: 498,128

[52] U.S. Cl. ................................ 285/260; 285/423
[51] Int. Cl.² ..................... F16L 31/00; F16L 33/22
[58] Field of Search .......... 285/242, 255, 260, 423, 285/323

[56] References Cited
UNITED STATES PATENTS

| 2,363,592 | 11/1944 | Hunter | 285/260 X |
| 2,880,722 | 4/1959 | Dickinson | 285/242 |
| 3,157,481 | 11/1964 | Bujan | 285/260 X |
| 3,561,726 | 2/1971 | Iannelli | 285/260 X |

FOREIGN PATENTS OR APPLICATIONS

| 275,452 | 5/1967 | Australia | 285/255 |
| 986,277 | 3/1965 | United Kingdom | 285/260 |

*Primary Examiner*—Dave W. Arola
*Attorney, Agent, or Firm*—Robert E. Burns; Emmanuel J. Lobato; Bruce L. Adams

[57] ABSTRACT

A union device comprises a hollow body of synthetic plastic material having a sleeve with a bore the diameter of which is slightly less than that of a flexible tube which can be press-fitted in, pulled out from and tightly held in the bore without constricting its inner passageway. A slidable external locking ring may consolidate holding of the tube.

2 Claims, 1 Drawing Figure

U.S. Patent  July 27, 1976  3,971,578
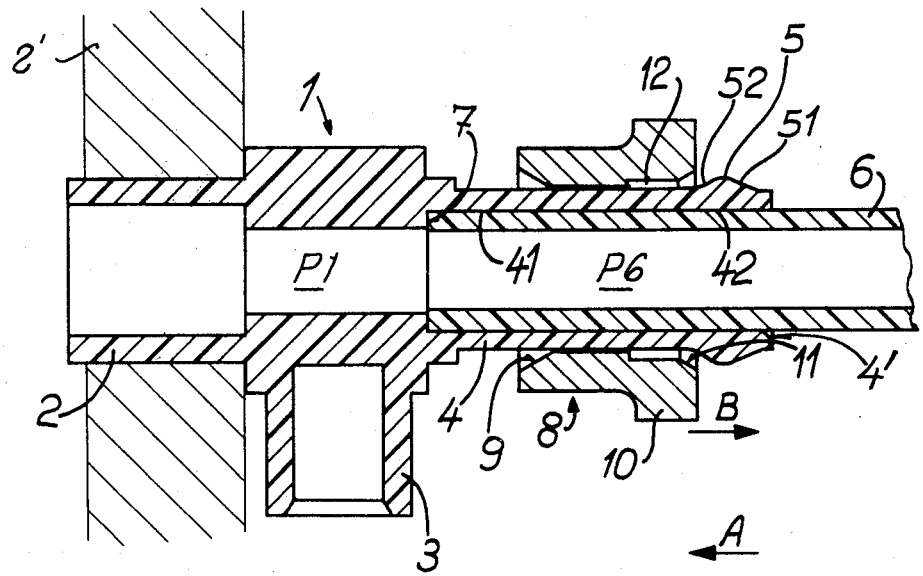

UNION DEVICE FOR FLEXIBLE TUBING

BACKGROUND OF THE INVENTION

The invention relates to union devices for securing flexible tubes, for example in pneumatic logical circuits, where rapid connection and disconnection of tubes is required.

The known union devices can be divided into two categories, those which employ a nozzle inserted in the open end of a tube, and which involve the drawback of considerably restricting the throughflow diameter, and those in which the open end of the tube is inserted in a nozzle or sleeve.

The invention is more particularly concerned with union devices of the latter type for use with flexible but semi-rigid tubes, i.e. which are resistant to radial deformation and hence to constriction of their passageway.

A recent proposal for such a union device has been to provide a split ring of resilient metal with a plurality of flexible tonques each carrying an inwardly directed claw. A toric joint is provided in the split ring which also carries an external sliding sleeve to enable radial deformation of the tonques in the manner of a chuck. These split ring assemblies are fitted onto a union housing by means of a special tool. In use, the end of a tube is pressed into the split ring, and then the sleeve is moved to firmly press the claws into the outer surface of the tube, to prevent unwanted removal. Apart from the complication of this arrangement, the ends of the tubes are liable to be damaged during withdrawal.

Another proposal has been to provide a deformable sleeve into which the end of a tube is freely inserted. An outer ring is then moved axially over the sleeve in order to constrict both the sleeve and the tube to provide a fluid-tight fit. These types suffer the drawback that a localized restriction, albeit a small one, of the inner passageway of the tube is always involed. Also, the smaller the axial extent of this restriction the less reliable is the fluid tightness of the joint, while the provision of a constriction along the whole length of the sleeve involves special tools to axially slide the ring.

An aim of the invention is to provide a union device of simple conception which enables a fluid-tight joint to be obtained rapidly, with practically no restriction of the inner passageway of the tube, and without a risk of damage to the end of the tube.

SUMMARY OF THE INVENTION

According to the invention, there is provided a union device comprising a hollow body of a synthetic plastic or the like material including a sleeve, and a flexible tube of material resistant to radial deformation. The sleeve is resiliently deformable radially and has a bore with a diameter which, prior to introduction of the tube, is slightly less than the outer diameter of the tube. Said bore extends from an open end of the sleeve over a length at least approximately twice its diameter, whereby an end part of the tube can be push fitted in and pulled out from the open end of the sleeve and tightly held in said bore of the sleeve with no or substantially no constriction of the inner passageway of the tube. Preferably, said bore extends up to a shoulder which defines a cylindrical passageway in the body with an inner diameter smaller than that of said bore but no smaller than that of the inner passageway of the tube, whereby said shoulder forms an abutment for the end of the tube.

In a preferred embodiment, the sleeve is provided towards its open end with an outer annular embossment, and the device further comprises a ring slidably mounted on the sleeve, said ring having an inner diameter which fits closely about the sleeve and, facing said embossment and the open end of the sleeve, an annular recess of smaller diameter than the embossment, said recess having a bevelled edge cooperating with the embossment in response to pushing of the ring towards said open end to compress the embossment in said recess and increase the grip on a fitted tube.

BRIEF DESCRIPTION OF THE DRAWING

An embodiment of the invention will now be described, by way of example, with reference to the accompanying drawings the single FIGURE of which is an axial cross-sectional view through an assembled union device.

The union device comprises a hollow body 1 of a synthetic plastic material, for example a polyamide such as that available under the Trade Mark Rilsan, integral with three sleeves 2, 3, 4 forming inlets and outlets. Sleeve 4 is adapted to removably receive a flexible tube 6 which, as shown, has an internal passageway P6 communicating with an internal passage P1 provided by the hollow body 1, and the other sleeves 2, 3 may be threaded or otherwise arranged for securing the body 1 to a support 2' and for permanently or temporarily connecting inlet or outlet tubes, not shown.

Sleeve 4 includes at its outer end, i.e. opposite to body 1, an outer annular embossment 5 in the form of a rounded bead. The inner bore of sleeve 4 extends from a bevel 4' at the outer end up to a stop abutment or shoulder 7, and has a length greater than twice its diameter. Stop 7 limits the insertion of tube 6 in sleeve or nozzle 4. The inner diameter of stop 7, through which fluid flows, is slightly greater than the inner diameter of tube 6.

The tube 6 to be fitted in and by sleeve 4 is shown as being of a synthetic plastic material, which may be flexible, for example nylon. Advantageously, the tube has a greater resistance to radial compression than sleeve 4 has to radial expansion. Before assembly, the inner bore of sleeve 4 has a diameter slightly less than the outer diameter of tube 6. For example, for a tube with an outer diameter of 4 mm, the difference between the outer diameter of tube 6 and the diameter of the bore could be 0.1 mm with a manufacturing tolerance of ± 0.5 mm. Generally speaking, the bore when undeformed has a diameter between about 1 and 4% less than that of the tube.

On the sleeve 4 is slidably mounted a metal ring 8 including conical chamfers 9 and 11 at opposite ends of its bore, end 10 adjacent chamfer 11 being enlarged. Chamfer 9 leads to a part of the bore whose inner diameter is only slightly greater than the outer diameter of sleeve 4, whereas chamfer 11 leads to an enlarged part 12 of the bore whose diameter is less than the outer diameter of embossment 5. Prior to fitting of tube 6, ring 8 is slid onto sleeve 4 by passing chamfer 9 over face 51 of embossment 5, in the direction indicated by arrow A.

Fitting of tube 6 is facilitated by chamfer or bevel 4' which enables the end of the tube 6 to be push fitted in the bore of sleeve 4 until this end abuts against stop 7. The tight frictional gripping of tube 6 in the sleeve 4, which is particularly accentuated in zone 41 adjacent stop 7 and body 1, provides an adequate fluid tightness, even at low pressures. This gripping involves an outward deformation of sleeve 4 and possibly an inward deformation of the outer wall of tube 6. However, practically no construction of the inner passageway of tube 6 is involved. When a pressurized fluid is supplied, the pressure further applies the outside of tube 6 against the inside of sleeve 4, thus adding to the firmness of the gripping of tube 6 in sleeve 4.

In order to improve securing of tube 6 in the zone 42 adjacent the outer open end 4' of sleeve 4 where the mutual gripping of tube 6 and sleeve 4 is least effective, and thereby more firmly to lock the tube 6 in sleeve 4, ring 8 can be slid longitudinally in the direction of arrow B, thus sliding chamfer 11 over face 52 of embossment 5, whereby the embossment 5 is inwardly radially compressed by part 12 of the bore of ring 8. The gripping is thus increased by a compression of embossment 5 but which does not cause any appreciable constriction of the inner passageway of tube 6.

To remove tube 6, ring 8 is slid back in the direction of arrow A, and the tube 6 is then simply pulled out of sleeve 4.

Of course, body 1 with its sleeve 4 and tube 6 could be made in the same material, for example one available under the Trade Mark Rilsan, and in this case the sleeve 4 will preferably be made thinner than tube 6.

Also, one or both of sleeves 2 and 3 could be provided in the same manner as sleeve 4, to enable a quick and removable connection of two or three tubes.

Although the ring 8 and embossment 5 are optional, it is preferred to incorporate them in the device. They can be optionally employed by the user when a connected tube is to be left in place permanently or for a long period of time.

What is claimed is:

1. A union device comprising; a hollow body providing an internal passage; a sleeve integral with the body and extending therefrom to an end of the sleeve remote from the body and enabling introduction of an end part of a flexible tube resistant to radial deformation; an outer annular embossment surrounding a portion of the sleeve adjacent the end thereof; and means for radially, releasably compressing the embossment to strengthen the tight holding of the end part of the tube in the bore of the sleeve; the sleeve being resiliently deformable radially and having a bore with an inner diameter which, prior to the introduction of the end part of the tube, is slightly less than the outer diameter of the tube, the sleeve and bore having a length at least approximately equal to twice said inner diameter, to enable the end part of the tube, upon the introduction thereof into the end of the sleeve, to be removably push-fitted into and tightly held in the bore of the sleeve, to place an inner passageway, provided by the tube, in communication with the internal passage provided by the hollow body with substantially no constriction of the inner passageway of the tube.

2. A union device comprising;
   a hollow body providing an internal passage therein;
   a sleeve integral with said body and extending therefrom to an end of the sleeve remote from the body and enabling introduction of a flexible tube resistant to radial deformation, the sleeve being resiliently deformable radially and having a bore with an inner diameter which, prior to the introduction of the tube, is slightly smaller than the outer diameter of the tube, the sleeve and bore having a length at least approximately equal to twice said inner diameter to enable an end part of the tube, upon the introduction thereof into said end of the sleeve, to be push-fitted into and tightly held in the bore of the sleeve and to place an inner passageway, provided by the tube, in communication with said passage provided by the hollow body, with substantially no constriction of the inner passageway of the tube, the sleeve having an outer annular embossment surrounding a portion of the sleeve adjacent said end, and
   a ring slidably mounted on the sleeve, said ring having an inner diameter which fits closely about the sleeve and having, in a surface of the ring facing said embossment and the end of the sleeve, an annular recess of smaller diameter than the embossment, said recess having a bevelled edge cooperating with the embossment in response to pushing of the ring towards said end of the sleeve to compress the embossment in said recess and strengthen the tight holding of the tube in the bore of the sleeve.

* * * * *